United States Patent [19]
Thatcher et al.

[11] Patent Number: 5,937,067
[45] Date of Patent: Aug. 10, 1999

[54] APPARATUS AND METHOD FOR LOCAL ENCRYPTION CONTROL OF A GLOBAL TRANSPORT DATA STREAM

[75] Inventors: William Bradford Thatcher, Atlanta; Anthony J. Wasilewski, Alpharetta, both of Ga.

[73] Assignee: Scientific-Atlanta, Inc., Norcross, Ga.

[21] Appl. No.: 08/745,483

[22] Filed: Nov. 12, 1996

[51] Int. Cl.$^6$ .............................. H04L 9/08; H04L 9/32; H04N 7/167
[52] U.S. Cl. .................................. 380/21; 380/9; 380/10; 380/20; 380/44; 380/49
[58] Field of Search .................................. 380/9, 10, 20, 380/21, 28, 44, 45, 46, 47, 49, 50, 59, 11, 12, 13, 14, 15, 16, 17, 18, 19, 23, 25

[56] References Cited

U.S. PATENT DOCUMENTS

| | | |
|---|---|---|
| 3,294,914 | 12/1966 | Muller . |
| 4,411,007 | 10/1983 | Rodman et al. . |
| 4,430,731 | 2/1984 | Gimple et al. . |
| 4,536,791 | 8/1985 | Campbell et al. . |
| 4,716,561 | 12/1987 | Angell et al. . |
| 4,726,013 | 2/1988 | Kawashima et al. . |
| 5,285,497 | 2/1994 | Thatcher, Jr. .............................. 380/49 |
| 5,742,677 | 4/1998 | Pinder et al. .......................... 380/21 X |

*Primary Examiner*—Bernarr E. Gregory
*Attorney, Agent, or Firm*—Kenneth M. Massaroni; Hubert J. Barnhardt, III; Kelly A. Gardner

[57] ABSTRACT

An encryption control system to process an input transport data stream into an output transport data stream includes an input demultiplexer, a first secure microprocessor, a second secure microprocessor and an output multiplexer. The input transport data stream includes first entitlement managment message data. The input demultiplexer culls the first entitlement managment message data from the input transport data stream, the first entitlement management message data including an encrypted multi-session key. The first secure microprocessor processes the first entitlement management message data to recover the multi-session key by decrypting the encrypted multi-session key using a first algorithm. The second secure microprocessor re-encrypts the multi-session key using a second algorithm and formats second entitlement management message data based on the first entitlement management message data with the re-encrypted multi-session key substituted for the encrypted multi-session key. The output multiplexer provides the output transport data stream based on the input transport data stream with the second entitlement management message data substituted for the first entitlement management message data.

7 Claims, 10 Drawing Sheets

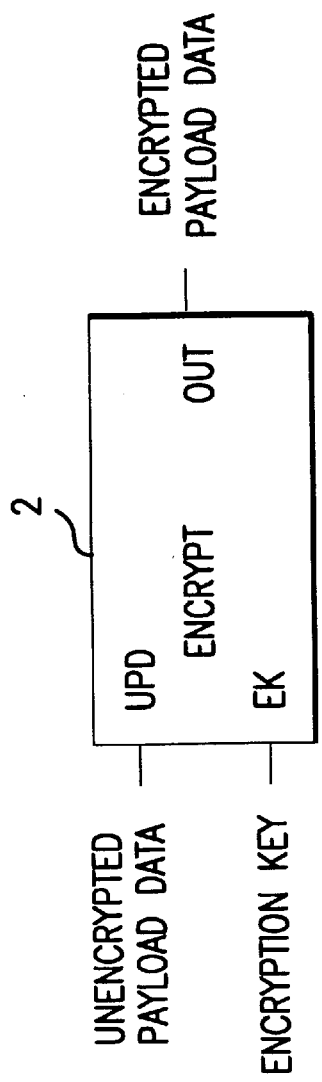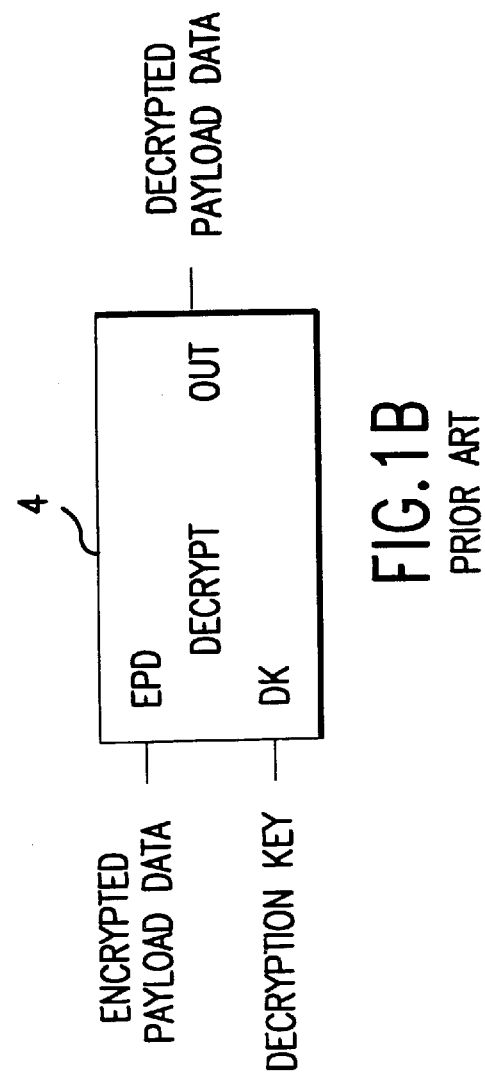

5,937,067

APPARATUS AND METHOD FOR LOCAL ENCRYPTION CONTROL OF A GLOBAL TRANSPORT DATA STREAM

BACKGROUND OF THE INVENTION

1. Field of the Invention

The present invention relates to conditional access cable television systems. In particular, the invention relates to a system by which a local cable headend operator may control access by his subscribers to a global or national transport data stream.

2. Description of Related Art

FIG. 1A depicts conventional encryptor 2. Unencrypted payload data UPD is processed using encryption key EK into encrypted payload data at output OUT of encryptor 2. FIG. 1B depicts conventional decryptor 4. Encrypted payload data EPD is processed using decryption key DK in decryptor 4 to produce decrypted payload data at output OUT of decryptor 4.

FIG. 2A depicts conventional encoder 10. FIG. 2B depicts conventional decoder 40. In FIG. 2A service provider 12 provides digital services, for example, MPEG encoded motion pictures, digital sound recordings, software, games, etc., for transport to decoder 40. The service is encrypted under a seed from pseudo-random number seed generator 14. Encryptor 22 processes the service data using the seed as the encryption key to produce encrypted service $E_{SEED}$ (SERVICE). The encrypted service is combined in multiplexer 20 and placed into transport data stream TDS. In order for decoder 40 to recover the service data from the encrypted service data, decoder 40 must be provided with the seed.

The seed is distributed in the transport data stream TDS in a broadcast mode (i.e., all decoders receive the seed at the same time). The seed must be encrypted to avoid exploitation by possible data pirates. The seed is encrypted in encryptor 24 using multi-session key MSK to provide encrypted seed $E_{MSK}$ (SEED). Multi-session key MSK comes from the service distributor 16. Encrypted seed $E_{MSK}$ (SEED) is placed in transport data stream TDS in a broadcast mode by multiplexer 20. Preferably, the seed is modified frequently, for example, ten times per second. Therefore, encrypted seed $E_{MSK}$ (SEED) is broadcast to all decoders 40 at, for example, ten times per second. In order to recover the seed, decoder 40 must gain access to multi-session key MSK.

Multi-session key MSK is distributed via transport data stream TDS to authorized decoders 40 (i.e., decoders of subscribers whose monthly bill has been paid). Preferably multi-session key MSK is changed once a month. In order to distribute multi-session key MSK over transport data stream TDS, the multi-session key is encrypted in encryptor 26 using secret serial number SSN as the encryption key to provide encrypted multi-session key $E_{SSN}$ (MSK). Since the encrypted multi-session key need only be provided to the decoders one time each month, it is possible to address the encrypted multi-session key to each decoder individually, in contrast to broadcasting the encrypted seed to all decoders simultaneously. In practice, the MSK is addressed and sent, in advance of it being needed, to each decoder many times during each month in order to ensure that, among other reasons, it is decrypted and available when needed. Multiplexer 20 places encrypted multi-session key $E_{SSN}$ (MSK) in transport data stream IDS only when the subscriber has paid his monthly bill. Each decoder 40 has stored within it a unique secret serial number SSN and a corresponding public serial number (used as an address). In FIG. 2A, secret serial number SSN and public serial number PSN for a particular decoder are retrieved from memory 18. Secret serial number SSN is provided to encrypter 26, and public serial number PSN is provided to multiplexer 20. When the bill has been timely paid, multiplexer 20 prepares encrypted multi-session key for transport to the decoder whose address is public serial number PSN.

In FIG. 2B, the corresponding secret serial number SSN and associated public serial number PSN is stored in memory 32 of decoder 40. Public serial number PSN is provided to demultiplexer 30 so that demultiplexer 30 can select an encrypted multisession key addressed to the decoder 40 under public serial number PSN which corresponds to the secret serial number from transport data stream TDS. Encrypted multi-session key $E_{SSN}$ (MSK) is decrypted in decryptor 34 using secret serial number SSN from memory 32 to provide multi-session key MSK. Demultiplexer 30 also selects from transport data stream TDS encrypted seed $E_{MSK}$ (SEED). The encrypted seed is processed in decryptor 36 using multi-session key MSK as the decryption key to provide the unencrypted seed. The unencrypted seed preferably changes at a high rate, for example, ten times per second. Demultiplexer 30 also selects from transport data stream TDS encrypted service $E_{SEED}$ (SERVICE). The encrypted service is processed in decryptor 38 using the seed as the decryption key to recover the unencrypted service.

Other means are known for the delivery of multi-session key MSK. For example, in U.S. Pat. No. 5,029,207 to Gammie, incorporated herein by reference, multi-session key MSK is twice encrypted at the encoder and twice decrypted in the decoder, first in a replaceable security module and then in a fixed security element of the decoder.

Furthermore, in order to defeat data pirates, memory 32. and decryptors 34 and 36 (FIG. 2B) and memory storage for multi-session key MSK (not shown) are mechanized within a secure microprocessor that denies pirates access to keys SSN and MSK. Although a pirate would still have access to the seed at the output terminals of the secure microprocessor, the useful life of the seed is short since it is changed often, for example, ten times per second.

FIG. 3 depicts conventional system 50 having national control center 52 that contains encoder 10. Transport data stream TDS from encoder 10 is transmitted by an uplink transmitter of national control center 52 to satellite repeater 54. Satellite repeater 54 transmits this signal so that cable head-end 56 receives the signal. Cable head end 56 re-transmits this signal to decoders 40.

In the national transport data stream (NTDS), entitlement management message EMM, which is uniquely addressable to an individual decoder, contains the MSK encrypted with the particular decoder's SSN as well as service authorization information for the particular decoder. In system 50 having national control center 52 that produces national transport data stream NTDS, national control center 52 provides both the encrypted MSK (i.e., $E_{SSN}$(MSK)) and the decoder service authorization information. The national center generates the appropriate entitlement management messages and addresses them to the individual encoders. The cable head-end operator simply acts as a conduit for this national transport data stream.

Some cable head-end operators, however, wish to have local control over the service authorization information. They want to have local control of a decoder's conditional access to programs and to particular programs. However, the local cable head-end operators do not feel a need to do their own program encryption. They would like to maintain the program encryption already performed at the national control center.

In many cable systems in use today, a national control center performs all of the multiplexing of services, as well as the encryption of each service and the global encryption of the entire payload part of the transport data stream. In such a system, cable head-end operators essentially act as conduits for this national signal. The national center also handles all other conditional access duties including placing service authorization information in entitlement management messages addressed to each decoder.

Other systems in use today allow the cable head-end operator to have local control over both conditional access and encryption. Some operators want the local control ability, but the equipment needed is, of course, more expensive.

Cable operators will want to somehow differentiate or control access to different market segments. For example, suppose three cable companies were operating in a given area. If all of them supplied their subscribers with a national center's signal, someone subscribing to one company could easily lend his/her settop decoder to someone subscribing to another company. Thus, there is a need for a system which would allow the cable head-end operator to continue using the signal supplied by the national center, but yet be able to control access to different market areas or segments.

SUMMARY OF THE INVENTION

It is an object to the present invention to provide a means by which a local cable headend operator can distribute national programming service data while controlling access by his subscribers to the data.

This and other objects are achieved in an encryption control system to process an input transport data stream into an output transport data stream that includes an input demultiplexer, a first secure microprocessor, a second secure microprocessor and an output multiplexer. The input transport data stream includes first entitlement management message data. The input demultiplexer culls the first entitlement management message data from the input transport data stream, the first entitlement management message data including an encrypted multi-session key. The first secure microprocessor processes the first entitlement management message data to recover the multi-session key by decrypting the encrypted multi-session key using a first algorithm. The second secure microprocessor re-encrypts the multi-session key using a second algorithm and formats second entitlement management message data based on the first entitlement management message data with the re-encrypted multi-session key substituted for the encrypted multi-session key. The output multiplexer provides the output transport data stream based on the input transport data stream with the second entitlement management message data substituted for the first entitlement management message data.

BRIEF DESCRIPTION OF DRAWINGS

The invention will be described in detail in the following description of preferred embodiments with reference to the following figures wherein:

FIGS. 1A and 1B are basic functional diagrams of known encryptors and decryptors, respectively;

DETAILED DESCRIPTION OF PREFERRED EMBODIMENTS

Figure 4:
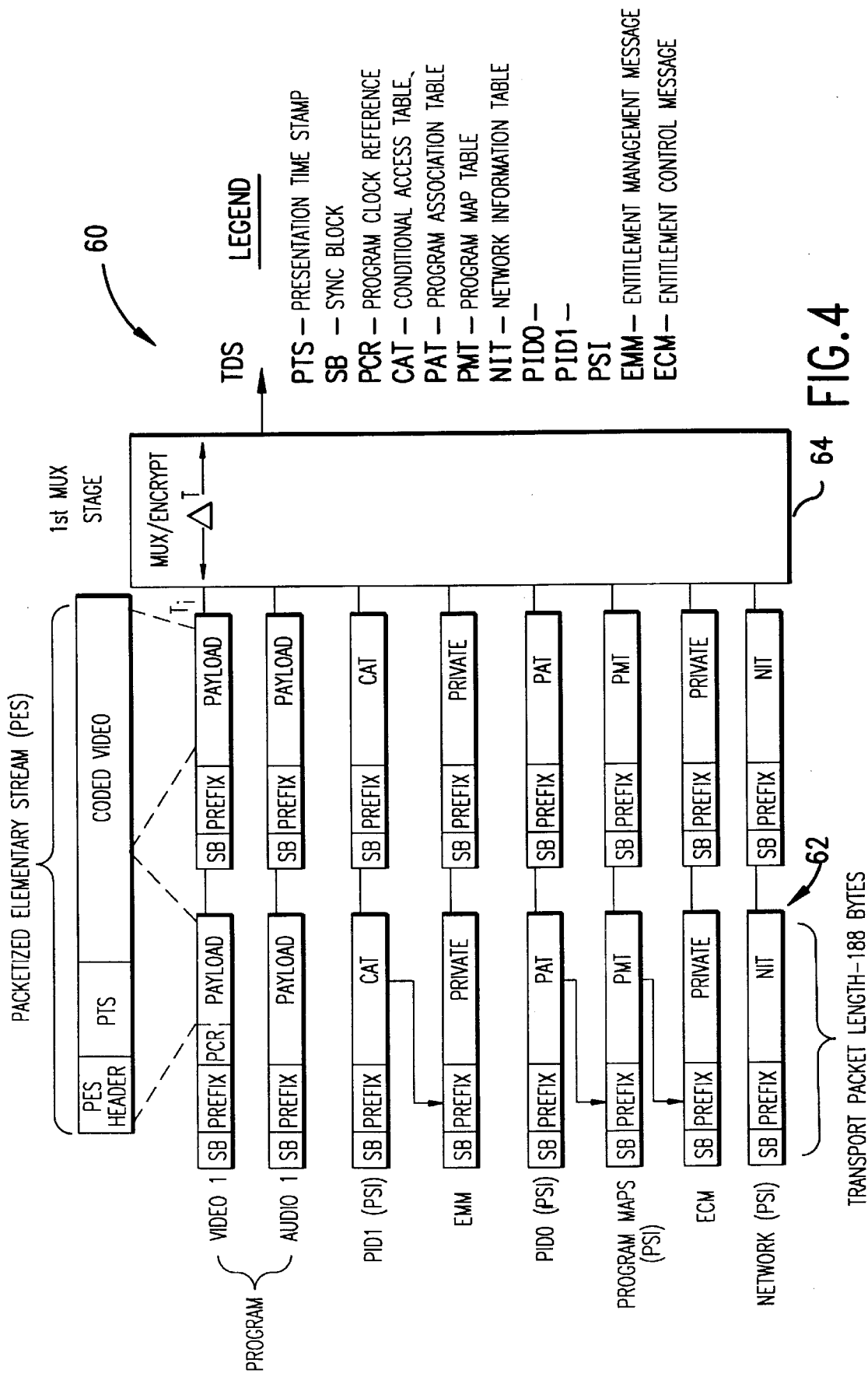
FIG. 4 is a format diagram depicting how elementary data streams are encoded in transport packets according to the present invention.

FIG. 4 is a format diagram of a representative transport data stream. Video and audio data are prepared in the form a packetized elementary stream having a header, a presentation time stamp, and the video itself. The packetized elementary stream is allocated into the payload section of one or more transport packets. Transport packets are preferably 188 bits in length. Transport packets preferably include a synchronization block and prefix data followed by payload data. Standards referred to as MPEG-2 (actually ISO/IEC 13818-1), incorporated herein by reference, define particular embodiments of the transport data stream. Multiplexer/encryptor 64 combines individual transport packets 62 into a frame of data 60.

Of particular interest to the present invention are entitlement management messages EMM and entitlement control messages ECM. These messages are multiplexed into the transport data stream TDS. Entitlement management messages are addressed to a specific decoder or group of decoders. Entitlement control messages are broadcast to all decoders. Seed data encrypted under a multi-session key is included in the data transmitted in the entitlement control message. Entitlement control message ECM is sent repeatedly at a high rate, for example, ten times a second. Multi-session key MSK, encrypted under a secret serial number, is included in entitlement management message EMM. The entitlement management message is addressed to the decoder that has stored in it the secret serial number used to encrypt the multi-session key. Entitlement management messages are sent infrequently, for example, once per month. In practical use, the entitlement management message is sent many times per month to each decoder so that the decoder will have the opportunity to decrypt and store the multi-session key for the upcoming session (e.g., next month). At a particular point in time the entitlement control message will provide data indicating the switch over to the new multi-session key which was received from an earlier entitlement management message.

Figure 2A:
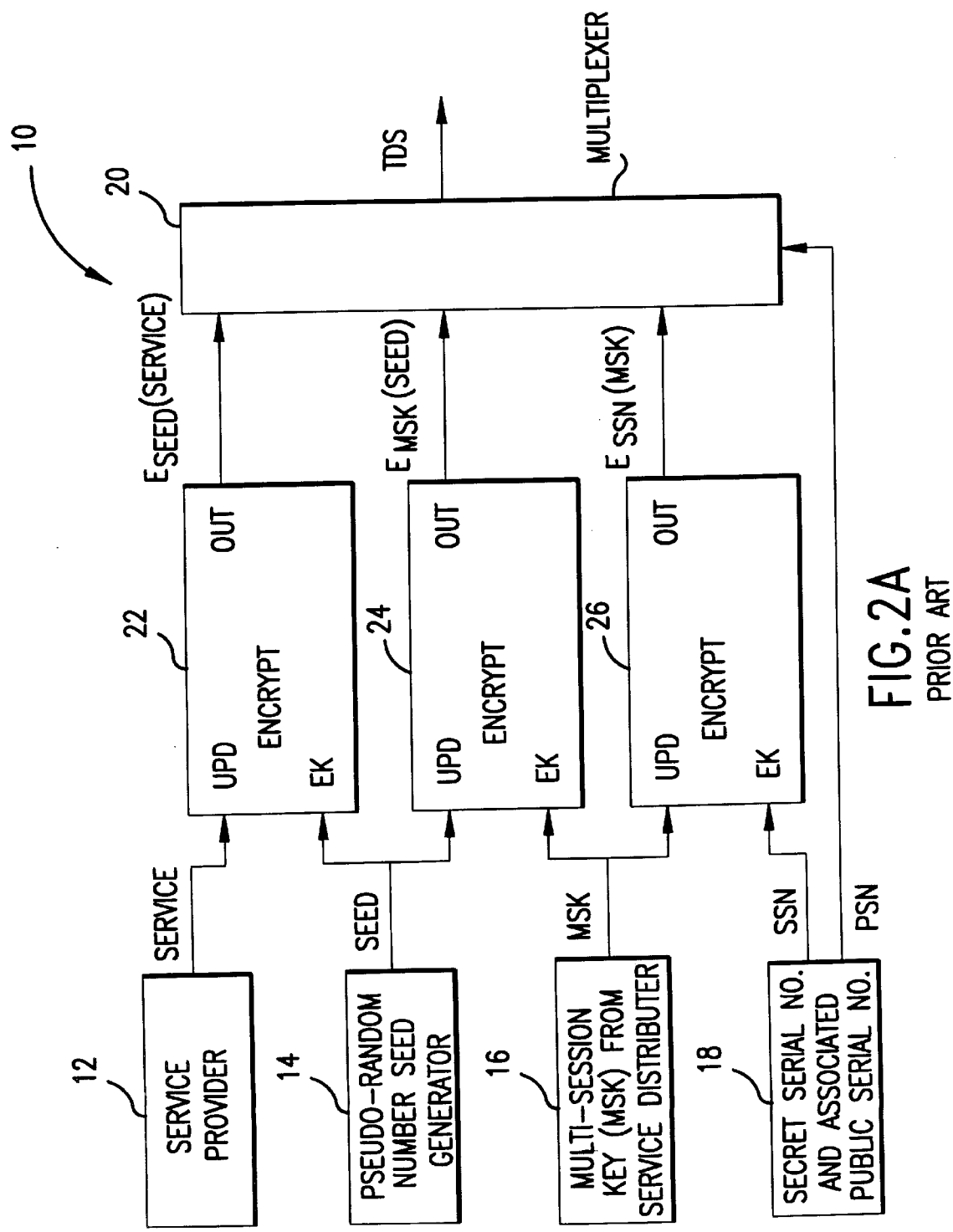
FIGS. 2A and 2B are functional block diagrams of known encoders and decoders, respectively.
Figure 2B:
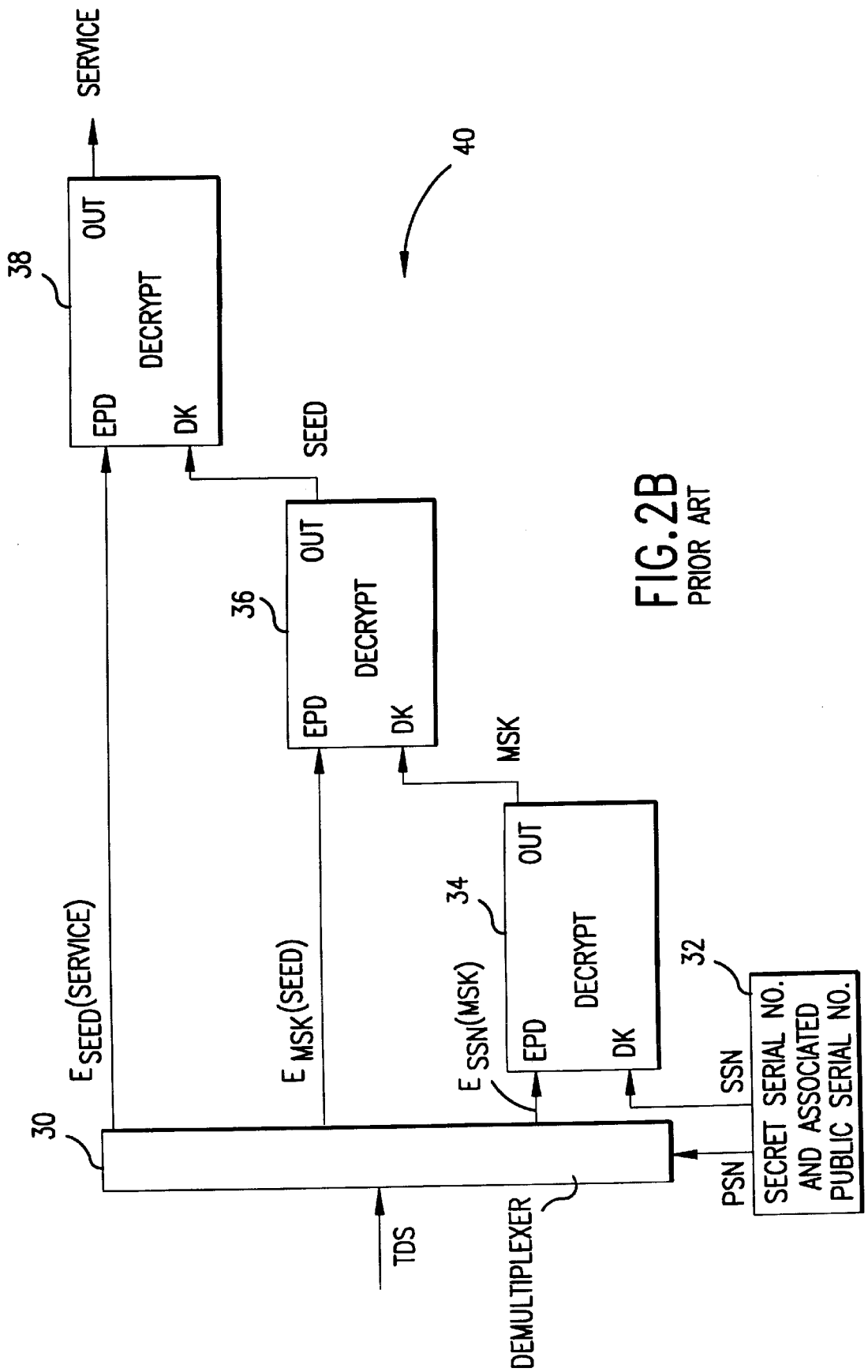
Figure 3:
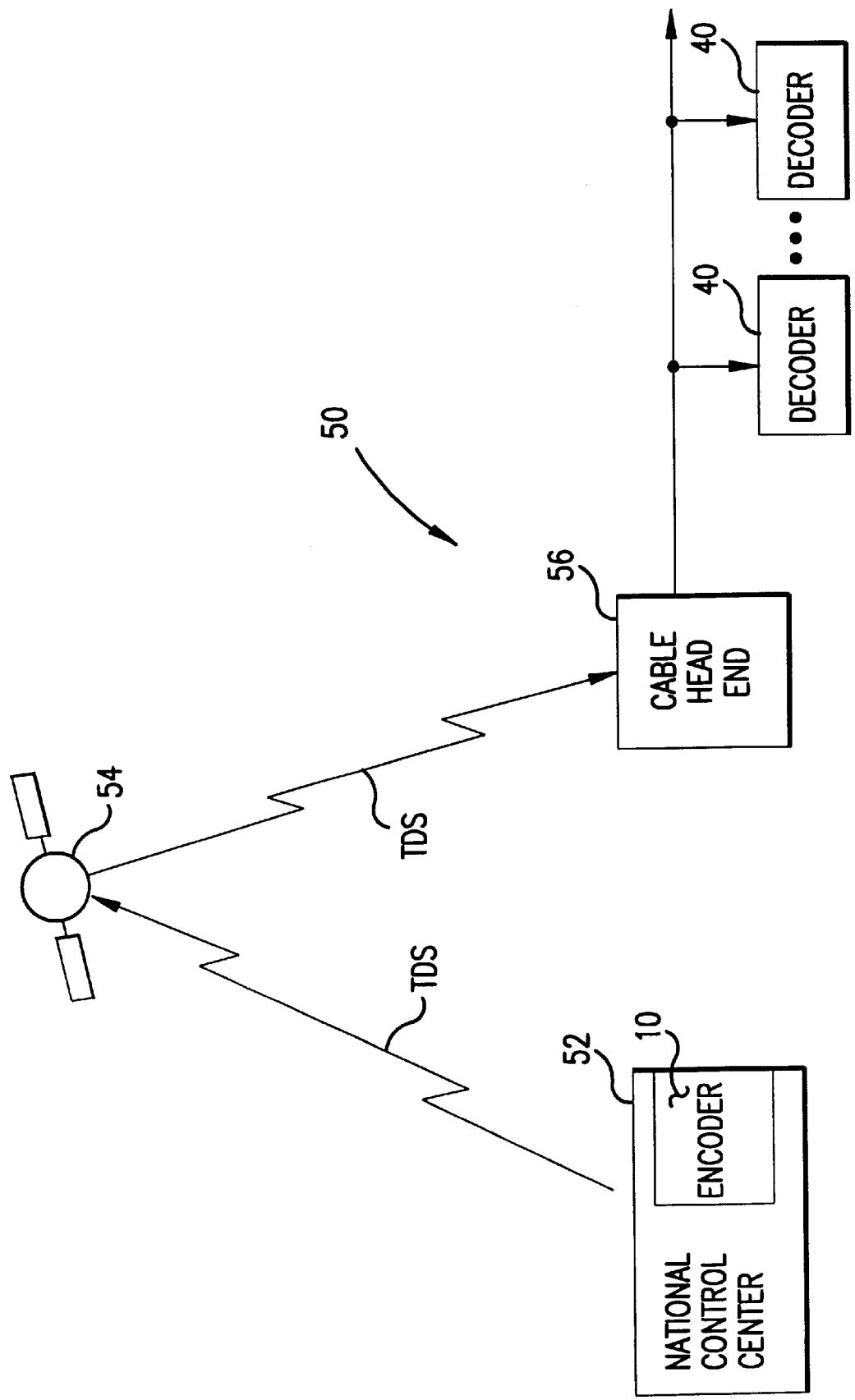
FIG. 3 is a block diagram of a known information distribution system.
Figure 5:
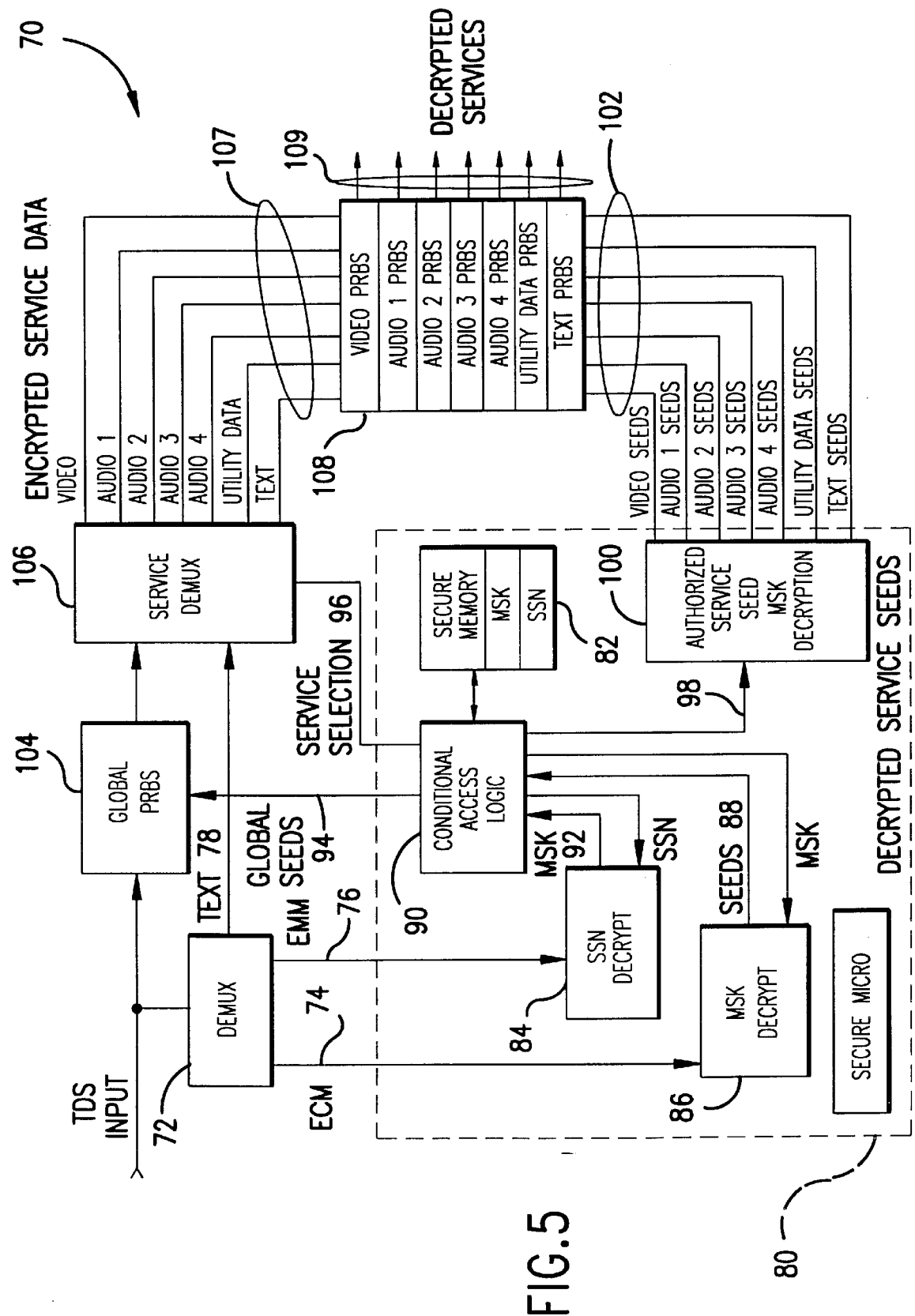
FIG. 5 is a functional diagram of a decoder according to the present invention.

FIG. 5 depicts a decoder according to the present invention for decoding the input transport data stream into decrypted services 109. De-multiplexer 72 separates from the transport data stream the entitlement control message 74, the entitlement management message 76 and text data 78. Other payload portions of the transport data stream are provided to decryptor 104. The de-multiplexer 72 provides similar functions to de-multiplexer 30 (FIG. 2B). Decoder 70 includes secure microprocessor 80. Secure microprocessor 80 includes secure memory 82 storing secret serial number SSN and multi-session key MSK. In secure microprocessor 80, conditional access logic 90 retrieves secret serial number SSN from secure memory 82 and provides the secret serial number to decryptor 84. Decryptor 84 processes entitlement management message 76 to recover multi-session MSK at 92. Conditional access logic 90 stores multi-session MSK in secure memory 82. Then, conditional access logic 90 reads multi-session key MSK from secure memory 82 and provides it to decryptor 86. Decryptor 86 processes entitlement control message 74 to recover a plurality of seeds and conditional access data 88. Conditional access logic 90 provides global seed 94 of seeds 88 to decryptor 104. Conditional access logic 90 processes conditional access data 88 to identify authorized services and provides service selection signal 96 to service de-multiplexer 106. For authorized services, conditional access logic 90 provides encrypted service seeds 98 from seeds 88 to decryptor 100 for decryption under the multi-service key. For authorized services, decryptor 100 provides seeds 102 to decryptors 108 for authorized services.

In FIG. 4, individual services (e.g., video 1 or audio 1) may be encrypted under respective service seeds. The encrypted, or unencrypted services are formatted into data frame 60. The entirety of the services portion of data frame 60 is encrypted under a global seed. The encrypted portion of data frame 60 is processed in decryptor 104 (FIG. 5) using global seed 94 to recover the individual services. The individual services may be encrypted or they may be unencrypted. The individual services are provided to multiplexer 106 (FIG. 5) where the individual encrypted service data 107 is provided to decryptors 108. Decryptor 108 processes the encrypted service data 107 using seeds 102 to provide decrypted services 109.

Figure 6:
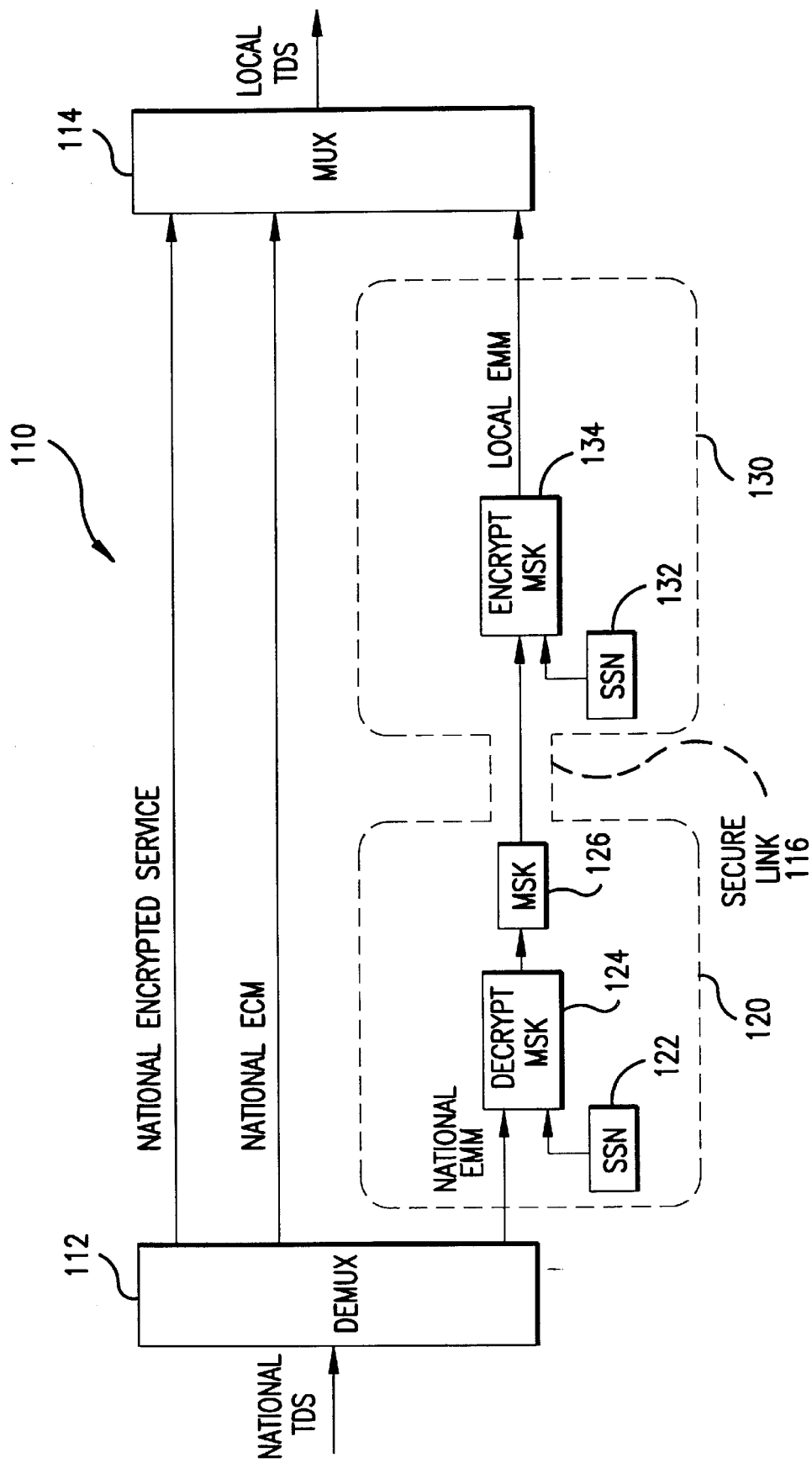
FIG. 6 is a functional block diagram of an encryption control system according to an embodiment of the present invention.

In FIG. 6, encryption control system 110 includes de-multiplexer 112, multiplexer 114, first secure microprocessor 120 and second microprocessor 130. Secure microprocessor 120 includes secret serial number memory 122, decryptor 124 and multi-session memory 126. Secret serial number memory 122 functions in the same way that secret serial number memory 32 (FIG. 2B) functions. Decryptor 124 functions in the same that decryptor 34 (FIG. 2B) functions. Memory 126 functions in the same way that memory 82 (FIG. 5) functions.

Second secure microprocessor 130 includes secret serial number memory 132 and encryptor 134. Memory 132 functions in the same way that memory 18 (FIG. 2A) functions, and encryptor 134 functions in the same way that encryptor 26 (FIG. 2A) functions. De-multiplexer 112 functions in the same way that de-multiplexer 30 (FIG. 2B) functions. Multiplexer 114 functions in the same way that multiplexer 20 (FIG. 2A) functions.

In a typical operation, a national source of transport data stream TDS is uplinked to a satellite repeater station. The satellite repeater station downilnks the broadcast of the national transport data stream TDS to a plurality of cable head-end operators, at least one of which has encryption control system 110 within its equipment. The cable head-end operator receives the national transport data stream TDS and de-multiplexes the data stream into national encrypted service data stream a national entitlement control message (national ECM) and a national entitlement management message (national EMM). The national entitlement management message is processed in encryption control system 110 into local entitlement management message (local EMM). Multiplexer 114 reassembles the national encrypted service data, the national entitlement control message data, and the local entitlement management message into a local transport data stream (local TDS).

The national entitlement management message is processed in encryptor 124 to recover and store the multi-session key in memory 126. The multi-session key is provided over a secure link 116 to encryptor 134. The mutli-session key is processed in encryptor 134 using secret serial number from memory 132, and it is then placed into the local entitlement management message. However, either (1) the encryption algorithm used by encryptor 134 is different than the encryption algorithm used by the national center to encrypt the multi-session key, or (2) the secret serial numbers stored in memory 132 is different than secret serial numbers stored in the comparable database used to encrypt the multi-session key at the national center, or (3) both.

Subscribers of the cable head-end operator will require a decoder with a decryptor for decrypting the multi-session key that has an algorithm compatible with encryptor 134 (FIG. 6). Similarly, decoders of subscribers of the cable head-end operator will have stored in them secret serial numbers that correspond to the secret serial numbers stored in memory 132 (FIG. 6). According to the present invention, a cable head-end operator having an encryption control system 110 in his equipment, can securely provide the multi-session key to the decoders within his system; however, because of the unique encryption algorithm 134 (i.e., unique to the cable head-end operator) and the unique list of secret serial numbers stored in memory 132, the decoder provided to the subscriber of the cable head-end operator is not useable to receive national encrypted services from either the satellite repeater station or any other cable head-end operator. In this way, the cable head-end operator may deny access to the national services when, for example, the subscriber does not pay his bill. Furthermore, the decoder provided to the subscriber of the cable head-end operator is not useable to receive encrypted services from any cable system so they are unlikely to be loaned out.

As described in U.S. Pat. No. 5,029,207, incorporated by reference, some decoders include decryptors having re-programmable decryption algorithms and/or re-programmable secret serial numbers. Such decryptors are re-programmable when specific addressed messages (e.g., the entitlement management messages described herein) are received by the particular decoder or group of decoders being addressed. When the national center uses this type of decoder, the local cable head-end operator may purchase and resell this type of decoder to his subscribers. Then the cable head-end operator may send appropriate entitlement management messages to individual decoders to change the algorithm used to decrypt the multi-session key or change the secret serial number address of the decoder. In this way a larger market exists for a single decoder design, and the cable head-end operator may provide the decoders to his subscribers at a lower cost based on the larger market.

Figure 7:
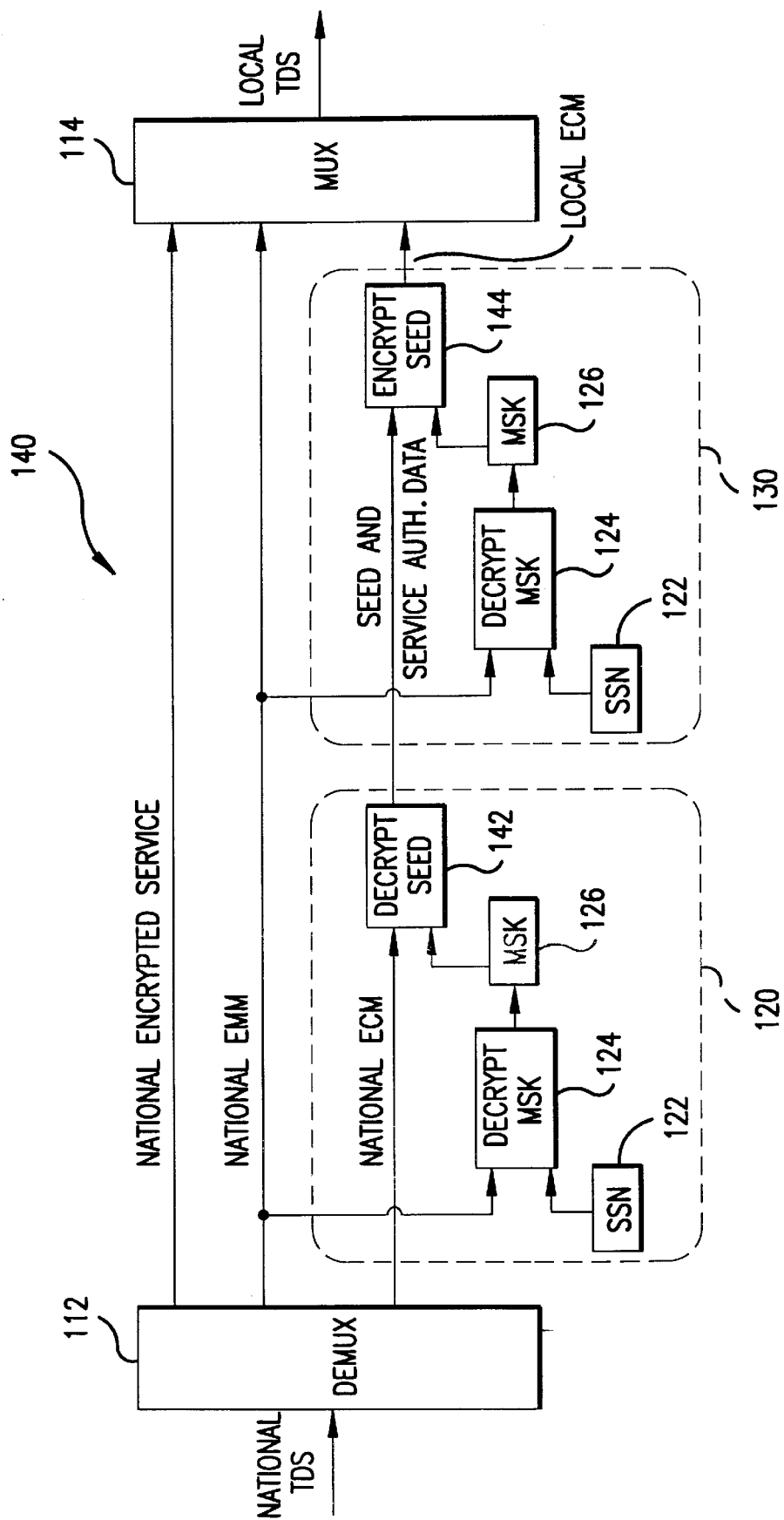
FIG. 7 is a functional block diagram of an encryption control system according to another embodiment of the present invention.

In FIG. 7, encryption control system 140 includes de-multiplexer 112, multiplexer 114, first secure microprocessor 120 and second secure microprocessor 130. First secure microprocessor 120 includes secret serial number memory 122, decryptor 124 and multi-service key memory 126 performing substantially the same function as is performed in secure microprocessor 120 of encryption control system 110 (FIG. 6). Secure microprocessor 120 of encryption control system 140 (FIG. 7) also includes decryptor 142 to process the national entitlement control message using the multi-session key to recover seed data and service authorization data.

Second secure microprocessor 130 of encryption control system 140 (FIG. 7) includes secret serial number memory 122, decryptor 124, multi-session key memory 126 and encryptor 144. Memory 122, decryptor 124 and memory 126 perform substantially the same functions as are performed in memory 122 decryptor 124 and memory 126 of secure microprocessor 120 of encryption control system 110 (FIG. 6), the function being to recover the multi-session key. Encryptor 144 processes seed and service authorization data using the multi-session key retrieved from memory 126 to provide local entitlement control messages. Multiplexer 144 reformats a local transport data stream from the national transport data stream with the national entitlement control message replaced by the local entitlement control message.

Cable head-end operators having encryption control system 140 in their equipment, may provide decoders to their subscribers of the cable head-end operators, decoders having a special (i.e., unique) decryption algorithm for decrypting the seed using the multi-session key. The encryptor 144 of encryption control system 140 encrypts the seed using an encryption algorithm that corresponds to the seed decryption algorithm provided in the decoders. In this way, the decoders so provided are only able to receive seeds when connected to the particular cable head-end operators equipment. Since the local entitlement control message is broadcast to all decoders in the cable head-end operator's system, it is not possible to disable individual decoders. However, the cable head-end operator may alter the service authorization data decrypted in decryptor 142 prior to being re-encrypted in encryptor 144 so as to provide a more limited service (i.e., lower cost service offering) to his subscribers.

As discussed above with respect to FIG. 6, re-programmable decoders may be provided to the subscribers of the local cable head-end operator under terms that the national center will provide certain specific reprogrmmmg services for the local cable head-end operator. It is preferable that the national center provide these re-programming services since the national center prepares the entitlement management messages addressed to each individual subscriber. Alternatively, the local cable head-end operator could provide these services if provided with the necessary secret serial number of the decoders and decryption algorithms of the decoder. The service provided by the national center is to re-program the decryption algorithm used to decrypt the seed data (different than to recover the multi-session key). In this way, the local cable head-end operator encrypts seed data in encryptor 144 with an encryption algorithm compatible with the reprogrammed decoder of his subscriber. This provides a large market for the re-programmable decoder while defeating the utility of taking the re-programmable decoder to another cable network. Thus, those cable head-end operators who provide these re-programmable encoders are less likely to loose their investment.

It is also possible for the national center to provide addressed entitlement management messages to the individual subscribers of the local cable head-end operator with a unique multi-session key, and provide the same multi-session key in an entitlement management message addressed to second secure microprocessor 130 of encryption control system 140 (FIG. 7) so that seed and service authorization data will be encrypted under this special multi-session key. That is to say, the multi-session key used in first secure microprocessor 120 is different than the multi-session key used in second secure microprocessor 130 of encryption control system 140 (FIG. 7). This process to deliver the special multi-session key can be arranged by agreement between national center and the local cable head-end operator. In decoder 70 (FIG. 5) global seed 94 will be correctly recovered. However, encrypted service seeds 98 (FIG. 5) are encrypted under a multi-service key that is transmitted to all of the subscribers of the national center. This corresponds to the multi-session key stored in memory 126 of secure microprocessor 120 of encryption control system 140 (FIG. 7). Unfortunately, it is the special multi-session key stored in memory 126 of second secure microprocessor 130 that would be transmitted by special agreement between the national center and the local head-end operator in the national entitlement management message addressed to the decoders of the subscribers of the local head-end operators. Thus, the subscribers of the local head-end operator would be able to recover only the special multi-session key and would not be able to recover service seeds 102 (FIG. 5). However, such arrangement may have utility when individual services are sent unencrypted, the block of service data being globally encrypted.

Figure 8:
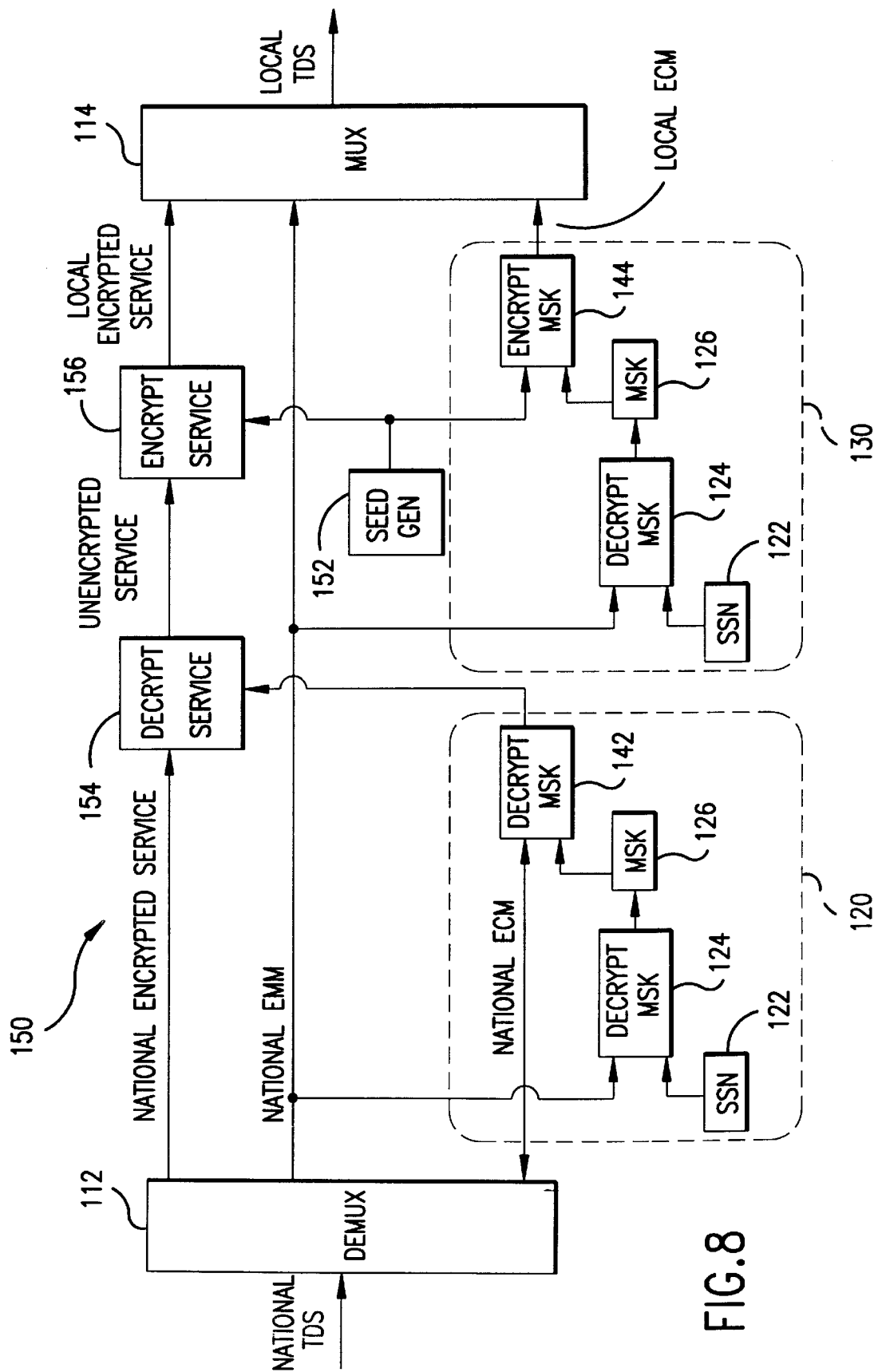
FIG. 8 is a functional block diagram of an encryption control system according to another embodiment of the present invention.

In FIG. 8, encryption system 150 includes de-multiplexer 112, multiplexer 114, first secure microprocessor 120, second secure microprocessor 130, seed generator 152, global service decryptor 154 and global service encryptor 156. In FIG. 8, global seed 94 (FIG. 5) is recovered and provided to global service decryptor 154. National encrypted service data is processed in global service decryptor 154 using global seed 94 to recover an unencrypted frame of service data. However, the unencrypted frame of service data may have individual services encrypted, but the frame of service data is unencrypted. Seed generator 152 simultaneously provides a new seed to global service encryptor 156 and seed encryptor 144 of second secure microprocessor 130 of encryption control system 150.

In operation, encryption control system 150 recovers an unencrypted frame of service data from global service decryptor 154 using global seed 94. Then, the unencrypted service data is re-encrypted in service encryptor 156 using a new seed. Simultaneously, the new seed is provided to seed encryptor 144 where it is encrypted under the multi-session key stored in memory 126 and incorporated in a local entitlement control message. Multiplexer 114 combines the local entitlement control message with the national entitlement management message and the locally re-encrypted service data to form a local transport data stream. The decoder, for example, decoder 70 of FIG. 5, decodes various services, encrypted with the new seed, in the same way that it would decode the same services when the seed is generated by the national center. The decoder is unable to detect the difference.

A unique encryption algorithm may be used for either (1) global service encryptor 156, or (2) seed encryptor 144, or (3) both. The unique encryption algorithm corresponds to a respective decrypted algorithm contained in decoder 70 (FIG. 5) provided to the subscribers of the local cable head-end operator. In this way, the national entitlement management message is used to deliver the multi-session key to each decoder including decoders of subscribers of cable head-end operators not having encryption control system 150 in its equipment. However, decoders with decryption algorithms corresponding to the encryption algorithms used in seed encryptor 144 and global service encryptor 156 are unusable on other cable systems. Furthermore, should the decoders in question be re-programmable, by agreement between the national center and the local head-end operator, it is possible for the national center to re-program the decryption algorithms in the decoders that correspond to the encryption algorithms used in seed encryptor 144 and global service encryptor 156.

Figure 9:
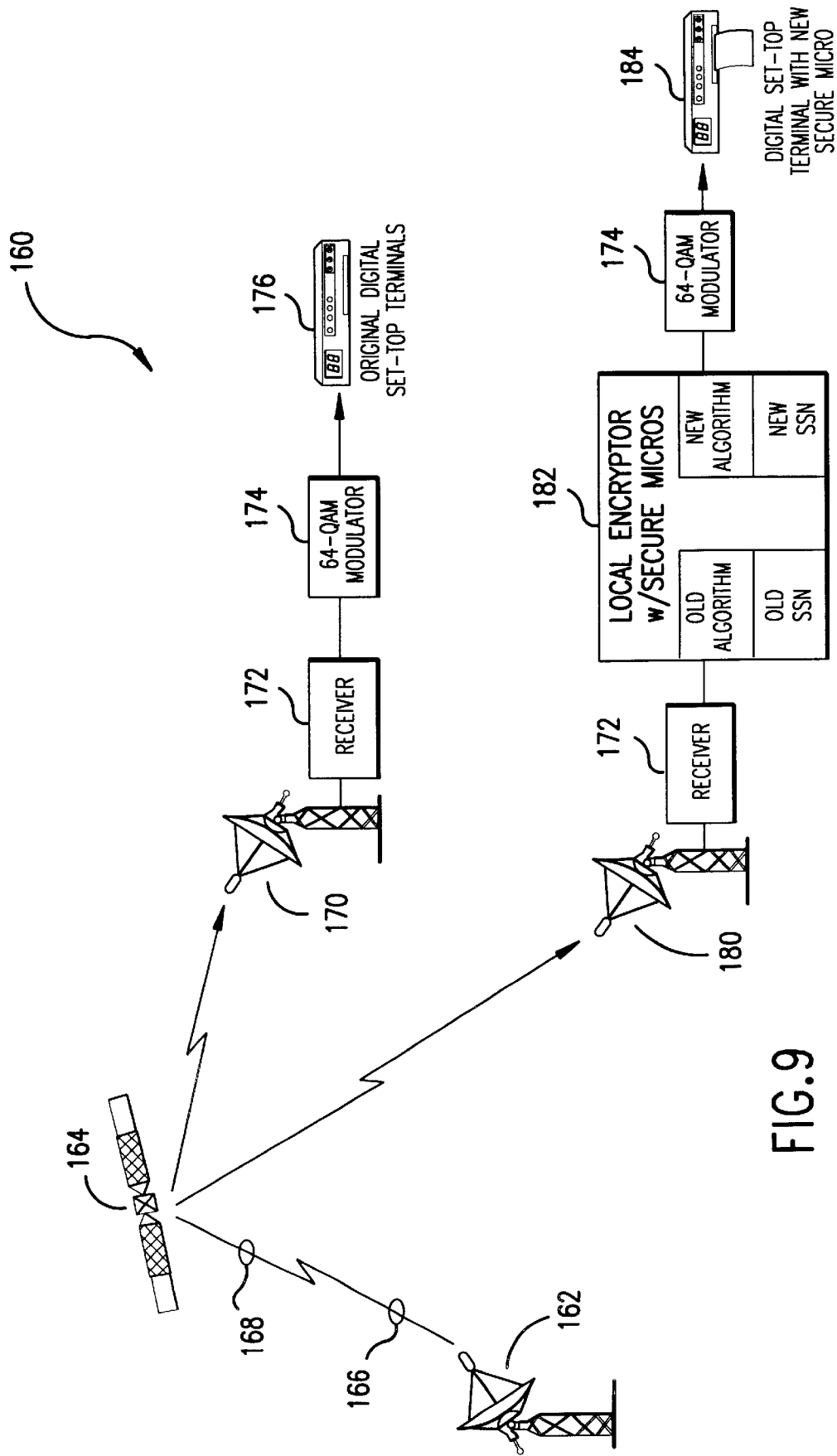
FIG. 9 is schematic diagram of an information distribution systems according to another embodiment of the present invention.

In FIG. 9, information distribution system 160 includes national center 162, satellite repeater 164, first user station 170 and second user station 180. First user station 170 includes receiver 172, cable head-end modulator 174 and at least one digital settop terminal 176. User station 180 includes receiver 172 local encryption control system 182, cable head-end modulator 174 and advance digital settop terminal 184.

Encryption control system 182 may be any one of encryption control system 110, 140, or 150. In a variant of encryption system 110, multi-session key encryptor 134 includes a two stage encryption where a first secret serial number encrypts the multi-session key to provide a once encrypted key and then the once encrypted key is processed through a further encryptor using a second secret serial number to provide a twice encrypted key. The twice encrypted key incorporated is in the local entitlement management message and transmitted in the local transport data stream (FIG. 6). The local transport data stream is modulated in cable head-end modulator 174 and transported to advanced digital settop terminal 184. Advanced digital settop terminal 184 is, for example, a settop terminal having a fixed security element integral with the decoder and a replaceable security module (i.e., smart card) pluggable into the decoder. For example, see U.S. Pat. No. 5,029,207, incorporated herein by reference. Advance digital settop terminal 184 includes two decryptors to recover the twice encrypted multi-session key. One decryptor is included in the fixed security element of the set top terminal itself (i.e, decoder) and the other decryptor is included in the removable security module (i.e., smart card).

In practice, a cable system operator having the same equipment as first user station 170 is only capable of transporting the national transport data stream to the local subscribers. Such an operator may upgrade his equipment by adding encryption control system 182 and/or sending a corresponding replaceable security module (i.e, smart card), to his subscribers. There is no need to replace all of the existing settop terminals.

Persons skilled in the art will appreciate that techniques described with respect to FIGS. 6–9 may be mixed and combined to provide any desired level of control. With appropriate mixtures the local cable head-end operator may disconnect subscribers who have failed to timely pay their bills, and provide low cost service offerings to subscribers by modifying conditional access data.

Having described preferred embodiments of a novel apparatus and method for local encryption of a global transport data stream (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims:

What is claimed is:

1. An encryption control system to process an input transport data stream into an output transport data stream, the input transport data stream including first entitlement management message data, the system comprising:

an input demultiplexer to cull the first entitlement management message data from the input transport data stream, the first entitlement management message data including an encrypted multi-session key;

a first secure microprocessor to process the first entitlement management message data to recover the multi-session key by decrypting the encrypted multi-session key using a first algorithm;

a second secure microprocessor to re-encrypt the multi-session key using a second algorithm and to format second entitlement management message data based on the first entitlement management message data with the re-encrypted multi-session key substituted for the encrypted multi-session key;

an output multiplexer to provide the output transport data stream based on the input transport data stream with the second entitlement management message data substituted for the first entitlement management message data.

2. The system of claim 1, further comprising first and second decoders wherein:

the first decoder includes first circuitry for recovering the multi-session key from the first entitlement management message data, the first circuitry being incapable of recovering the multi-session key from the second entitlement management message data; and the second decoder includes second circuitry for recovering the multi-session key from the second entitlement management message data, the second circuitry being incapable of recovering the multi-session key from the first entitlement management message data.

3. An encryption control system to process an input transport data stream into an output transport data stream, the input transport data stream including first entitlement management message data, the system comprising:

an input demultiplexer to cull the first entitlement management message data from the input transport data stream, the first entitlement management message data including an encrypted multi-session key;

a first secure microprocessor to process the first entitlement management message data to recover the encrypted multi-session key by decrypting the encrypted multi-session key using a first secret serial number;

a second secure microprocessor to re-encrypt the multi-session key using a second secret serial number and to format second entitlement management message data based on the first entitlement management message data with the re-encrypted multi-session key substituted for the encrypted multi-session key;

an output multiplexer to provide the output transport data stream based on the input transport data stream with the second entitlement management message data substituted for the first entitlement management message data.

4. An encryption control system to process an input transport data stream into an output transport data stream, the input transport data stream including first entitlement control message data, the system comprising:

a circuit for receiving a multi-session key;

an input demultiplexer to cull the first entitlement control message data from the input transport data stream, the first entitlement control message data including encrypted seed data;

a decryptor to process the first entitlement control message data to recover seed data by decrypting the encrypted seed data using the multi-session key and a first algorithm;

an encryptor to process the recovered seed data using the multi-session key and a second algorithm to provide re-encrypted seed data and to format second entitlement control message data based on the first entitlement control message data with the re-encrypted seed data substituted for the encrypted seed data; and an output multiplexer to provide the output transport data stream based on the input transport data stream with the second entitlement control message data substituted for the first entitlement control message data.

5. An encryption control system to process an input transport data stream into an output transport data stream, the input transport data stream including first entitlement control message data and first encrypted service data, the system comprising:

a circuit for receiving a multi-session key;

an input demultiplexer to cull the first entitlement control message data and the first encrypted service data from the input transport data stream, the first entitlement control message data including encrypted seed data;

a first decryptor to process the first entitlement control message data to recover first seed data by decrypting the encrypted seed data using the multi-session key;

a second decryptor to process the first encrypted service data using the first seed data to recover unencrypted service data;

a seed generator to generate second seed data;

a first encryptor to process the second seed data using the multi-session key to provide re-encrypted seed data and to format second entitlement control message data based on the first entitlement control message data with the re-encrypted seed data substituted for the encrypted seed data;

a second encryptor to process the unencrypted service data using the second seed data to provide second encrypted service data; and an output multiplexer to provide the output transport data stream based on the input transport data stream with the second entitlement control message data substituted for the first entitlement control message data and the second encrypted service data substituted for the first encrypted service data.

6. An information distribution system to broadcast a transport data stream through a repeater station to user stations, the transport data stream including first and second entitlement management message data, the first entitlement management message data including a multi-session key encrypted using a first algorithm, the second entitlement management message data including the multi-session key encrypted using a second algorithm, the-information distribution system comprising:

a control center to transmit the transport data stream to the repeater station;

a first user station to receive the transport data stream from the repeater station, the first user station providing the transport data stream to a first plurality of decoders without controlling the decoders' access to the transport data stream; and a second user station to receive the transport data stream from the repeater station, the second user station providing the transport data stream to a second plurality of decoders while controlling the decoders' access to the transport data stream.

7. The system of claim 6, wherein decoders of the first plurality of decoders recover the multi-session key from the first entitlement management message data by decryption based on the first algorithm, and wherein the second user station includes:

a circuit for recovering the multi-session key from the second entitlement management message data by decrypting the encrypted multi-session key based on the second algorithm;

a memory to store a local key;

an encryptor to re-encrypt the multi-session key using the local key and the second algorithm to provide third entitlement management message data; and an output multiplexer to provide a local data stream to the second plurality of decoders based on the transport data stream with the third entitlement management message data substituted for the second entitlement management message data.

* * * * *